UNITED STATES PATENT OFFICE.

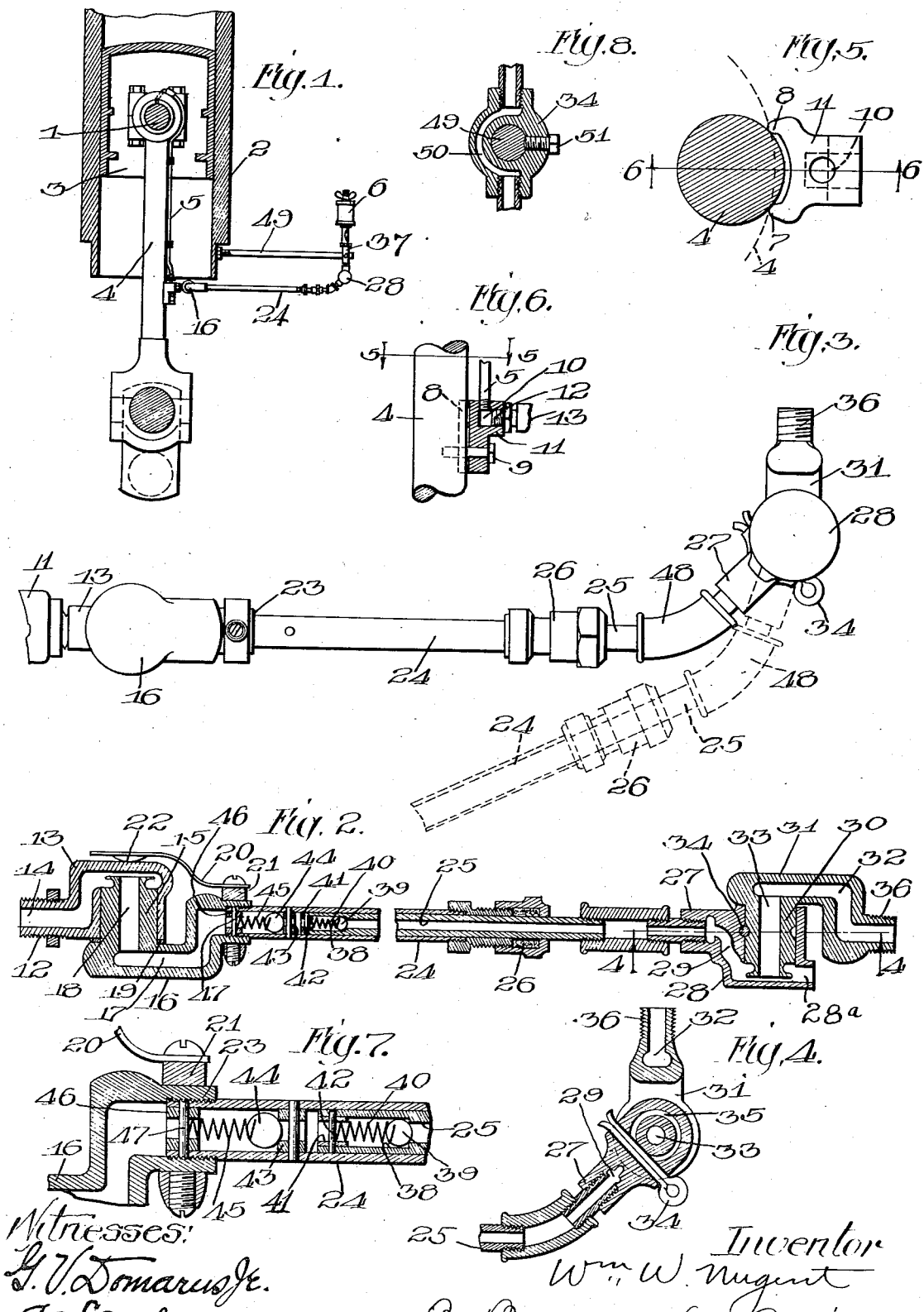

WILLIAM W. NUGENT, OF CHICAGO, ILLINOIS.

OILING DEVICE.

950,556.  Specification of Letters Patent.  Patented Mar. 1, 1910.

Application filed June 1, 1908. Serial No. 435,855.

*To all whom it may concern:*

Be it known that I, WILLIAM WASHBURN NUGENT, a citizen of the United States, residing at Chicago, county of Cook, and State of Illinois, have invented certain new and useful Improvements in Oiling Devices, of which the following is a full, clear, and exact specification.

My invention relates to that class of oiling devices such as shown in my United States Patent No. 774,969, granted November 15, 1904, by which the lubricant is conducted from a stationary supply of oil to the part to be lubricated while the latter is undergoing motion, and the primary object of my present invention is to provide a device of this character with improved and simple means whereby the oil in being conducted to its place of use, will be subjected to sufficient pressure to force it into the bearing, or to raise it to an elevation above that to which it would ordinarily flow by gravity or capillarity.

Another object of the invention is to provide an improved and simple joint or packing which will keep the relatively moving parts of the device oil-tight while at the same time being capable of yielding to relieve the device of an excess of pressure.

The invention having reference to that class of oiling devices in which a telescopic or extendible connection is employed for conducting the oil from the stationary supply to a moving part of the machinery, it has for another object to provide improved and simple means whereby the telescopic connections will serve as a pump for forcing the lubricant to its destination.

With a view to the attainment of these ends and the accomplishment of certain other objects which will hereinafter appear, the invention consists in the features of novelty which will now be described with reference to the accompanying drawings and more particularly pointed out in the claims.

In the said drawings, Figure 1 is a side elevation of my improved oiling device as applied to one of the working parts of a vertical reciprocating piston for an engine or pump. Fig. 2 is an enlarged detail longitudinal sectional view of the oiling device detached. Fig. 3 is a side elevation of the same, also showing the parts in their extended position in dotted lines. Fig. 4 is a detail section on the line 4—4, Fig. 2. Fig. 5 is an enlarged cross section of the piston or connecting rod taken on the line 5—5, Fig. 6, showing a saddle or block by which one end of the oiling device is attached to said rod. Fig. 6 is a longitudinal sectional view thereof, taken on the line 6—6, Fig. 5. Fig. 7 is an enlarged detail sectional view of the telescopic members showing the valves for controlling the lubricant passage. Fig. 8 is an enlarged detail sectional view of the housing to which the support is secured for holding the oil cup and the free extremities of the telescoping members in position.

Experience has demonstrated that in many instances where a device such as the one shown in my aforesaid patent would be desirable for use, there is necessary a degree of pressure upon the oil greater than that which would result from gravity, in order to compel the oil to reach its intended destination. There are, of course, many instances where either the elevation of the part to be lubricated, or the peculiar motion under which it is going prevents the oil from reaching the surfaces to be lubricated, unless subjected to artificial pressure. As one example, I have shown the device applied to a piston pin 1 of an upright gas engine or pump 2, 3 being the piston and 4 the piston rod or connecting rod. In this instance the lubricant is led upwardly through a pipe or tube 5 secured to the connecting rod 4 longitudinally thereof, and discharging at the proper point above pin 1. This pipe or tube 5 is supplied with lubricant from an oil feed cup 6, or other suitable stationary supply, between which and the end of the tube is interposed the oil device of my aforesaid patent, as modified by my present improvements.

In applying the device to the connecting rod 4, I employ a block or saddle shown in detail in Figs. 5 and 6, having feet 7, 8, adapted to rest against the side of the connecting rod 4, whether it be round or flat, or of the small diameter shown in full lines or the much larger diameter shown in dotted lines in Fig. 5. This saddle or block is held in place on the connecting rod by a cap screw 9 or other suitable means passing therethrough, and screw-threaded in the connecting rod, and the saddle is provided in one side with a threaded socket 10 for receiving the lower end of the pipe 5. Contiguous to this socket 10 and communicating therewith is a threaded boss 11, into which is screw-threaded a screw-threaded end 12 of a member 13 having an oil passage 14. This member 13 receives a wrist-pin 15 formed on the member 16, having an oil passage 17 which communicates with the oil passage 18 in the wrist-pin 15. Surrounding the wrist-pin 15 is a gasket or packing 19, which is situated between the face of the member 16 and the contiguous face of the member 13 so as to form a tight joint and prevent the escape of oil between the wrist-pin 15 and the member 13. The members 13, 16 are pressed squarely against the packing 19 by any suitable yielding means, such as a leaf spring 20 secured by a collar 21 to the member 16 and having a bearing boss 22 pressing against the outer face of the member 13 opposite the axis of rotation of the wrist-pin 15. By this means it will be seen that the members are held against the packing 19 with sufficient force to prevent leakage of oil under ordinary conditions, but will nevertheless yield and permit the oil to escape in the event the pressure should become so excessive as to endanger the parts.

Screw-threaded, or otherwise secured within a neck 23 of the member 16 is a tube or barrel 24, and telescoping with this tube or barrel is another tube or hollow member 25, which passes through a suitable stuffing box 26 on the end of tube 24, and is secured in a neck 27 of a member 28. This latter has an oil passage 29 communicating with the tube or hollow member 25 and the member 28 receives a wrist-pin 30 formed on a member 31 having a passage 32 communicating with passage 33 in wrist-pin 30. In the peripheral wall of member 28 and adjacent to the outlet of passage 33 is an air inlet 28ª, which facilitates the action of the telescopic pumping connection by admitting air during the suction portion of the operation. The aperture 28ª is so positioned in member 28 as to be above the passage 33 when the parts are operatively connected with an engine. The member 28 is susceptible of oscillation on the wrist-pin 30, but is held against longitudinal movement along said wrist pin by a key or pin 34 passing through member 28 and engaging in a peripheral groove 35 in the wrist-pin 30. The member 31 is formed with a screw-threaded neck 36 communicating with the passage 32 and adapted to be connected in any suitable way with the oil supply reservoir or cup 6. In this exemplification of the invention, the neck 36 is screwed into the lower end of a housing 37, which permits the supply or feed from the cup 6, and which supports the cup and one end of the member 25.

The lubricant passes down or along tube or hollow member 25 and discharges into the tube or barrel 24. The member 25 is slightly enlarged at its inner end, as shown at 38, so as to constitute a valve seat and housing for a ball or other suitable valve 39. This valve is held to its seat by a spring 40, and the spring is held in place by a small bushing 41 and a pin 42. Near the contiguous end of the barrel 24 is arranged a bushing 43 which constitutes a seat for a ball or other suitable valve 44, held against this seat by a spring 45, and this spring is held in place by a bushing 46 and a cross-pin 47. Consequently, as the telescopic members or tubes 24, 25 pull apart, or the member 24 moves outwardly with respect to the member 25, a partial vacuum is created between the valves 39, 44, and lubricant which may be in the tube 25 will be drawn into the space between the valves and at the next stroke of the parts will be forced past the valve 44 into the passages 17, 18, and thence on to the bearing through any pipe or passage which may be provided for taking the lubricant away from the passage 14 of the neck 12. Thus, at each stroke of the piston 3 in the example shown in the drawings, the telescopic members 24, 25 will act as a pump to force the lubricant from its stationary source of supply to the parts to be lubricated, and they will serve the further necessary function of providing a continuous passage between the source of supply and the moving part to which one of them is connected.

In the present exemplification of the invention, a portion of the hollow member 25, preferably the outer extremity thereof, is curved upwardly, as at 48, and may be constructed in any desired or suitable manner, preferably by means of a curved elbow intermediate the extremities of the member 25 and the member 28, so that any oil or lubricant which may be fed, or which may drop from the oil cup 6 will pass into the curved portion 48, which latter forms a pocket to retain the oil or lubricant, and when the telescoping members 24, 25, are moved into the position shown in dotted lines in Fig. 3, the oil or lubricant will run down or through the member 25 so as to be drawn or sucked out of the member 25 when the two members are expanded.

Any suitable means may be provided for holding the cup 6 and the free extremities of the telescoping members in position. A suitable and efficient means for accomplishing this purpose comprises a supporting bar or member 49, one end of which is secured to the engine cylinder 2, and the other extremity is adapted to extend into the housing 37 beyond the oil passage 50 (Fig. 8) therein, and the housing 34 may be held against displacement with relation to the support 49, preferably by means of a fastening screw or bolt 51, which passes through the housing and has engagement with the support 49.

I claim—

1. In a device for the purpose described, the combination of two hollow telescopic members, a pivot pin upon which one of said members is adapted to oscillate, means for supplying the latter with lubricant while oscillating upon said pin, a movable part to be lubricated, a pivotal connection between the other one of said telescopic members and said movable part having a passage for the lubricant communicating with the said hollow telescopic members, a plurality of pressure operated check valves mounted within said members intermediate of the pivoted ends thereof whereby the reciprocating action of the telescopic members is adapted to pump the lubricant through said pivotal connection and the moving part to be lubricated.

2. In a device for the purpose described, the combination with a source of lubricant and a movable part to be lubricated, of two telescopic members having longitudinal lubricant passages, a pressure operated check valve in each of said members, pin and socket connections for pivotally connecting the outer ends of the telescopic members to the source of lubricant and to the part to be lubricated respectively, and means for yieldingly holding said pivoted members together to provide relief for excess of pressure.

3. In a device for conveying lubricant from a stationary receptacle to a moving part to be lubricated, the combination of a tubular member rotatably connected with said receptacle, a second tubular member rotatably connected with said moving part, said members being telescopically connected and provided with pressure operated valves adapting them to pump the lubricant therethrough, and means connected with the first member for admitting air during the pumping portion of the operation.

In testimony whereof I have signed my name to this specification, in the presence of two subscribing witnesses, on this 28th day of May, A. D. 1908.

WM. W. NUGENT.

Witnesses:
CHAS. H. SEEM,
FRANCIS A. HOPKINS.